(12) United States Patent
Guion (10) Patent No.: US 9,010,035 B1
(45) Date of Patent: Apr. 21, 2015

(54) SAFE ROOM ASSEMBLY

(71) Applicant: Paul Guion, Mansfield, TX (US)

(72) Inventor: Paul Guion, Mansfield, TX (US)

(*) Notice: Subject to any disclaimer, the term of this patent is extended or adjusted under 35 U.S.C. 154(b) by 0 days.

(21) Appl. No.: 14/060,849

(22) Filed: Oct. 23, 2013

Related U.S. Application Data (63) Continuation-in-part of application No. 14/033,619, filed on Sep. 23, 2013.

(51) Int. Cl.
*E04H 9/14* (2006.01)
*E04B 1/348* (2006.01)

(52) U.S. Cl.
CPC .............. *E04H 9/14* (2013.01); *E04B 1/34823* (2013.01)

(58) Field of Classification Search
CPC .............. E04H 9/00; E04H 9/04; E04H 9/06; E04H 9/08; E04H 9/10; E04H 9/12; E04H 9/14; E04H 9/145; E04H 3/08; E04B 1/0007; E04B 1/161; E04B 1/34823; E04C 2/52
USPC ................. 52/169.6, 106, 79.11, 79.9, 220.1, 52/220.2, 20.8; 109/1 S, 58, 64
See application file for complete search history.

(56) References Cited

U.S. PATENT DOCUMENTS

| | | | | |
|---|---|---|---|---|
| 4,126,972 A | * | 11/1978 | Silen | 52/34 |
| 4,538,507 A | * | 9/1985 | Bergeron, Jr. | 454/230 |
| 4,843,788 A | * | 7/1989 | Gavin et al. | 52/205 |
| 5,044,134 A | * | 9/1991 | Brockway | 52/79.1 |
| 5,210,985 A | * | 5/1993 | Hsu | 52/169.6 |
| 6,263,637 B1 | * | 7/2001 | Spene et al. | 52/745.02 |
| 6,938,381 B1 | * | 9/2005 | Villa | 52/79.1 |
| 7,237,362 B2 | * | 7/2007 | Bishop | 52/79.2 |
| 7,458,305 B1 | * | 12/2008 | Horlander et al. | 89/36.01 |
| 2008/0005976 A1 | * | 1/2008 | Montaigne | 52/79.1 |
| 2009/0126293 A1 | * | 5/2009 | Khalili et al. | 52/220.1 |
| 2009/0223143 A1 | * | 9/2009 | Esposito | 52/79.1 |
| 2010/0132271 A1 | * | 6/2010 | Fernandez Fernandez | 52/79.9 |
| 2013/0086849 A1 | * | 4/2013 | Clouser et al. | 52/79.9 |

* cited by examiner

*Primary Examiner* — Elizabeth A Plummer
*Assistant Examiner* — Kyle Walraed-Sullivan
(74) *Attorney, Agent, or Firm* — Richard G. Eldredge (57) ABSTRACT

A safe room assembly includes a solid concrete wall forming an enclosed area, a conduit disposed within the concrete wall and extending from one end that is exposed at an outside surface of the concrete wall to an inside surface of the concrete wall, and an utility system in communication with the conduit. The enclosed area is configured to provide safe harbor to an occupant during extreme weather conditions and the utility system is configured to provide utilities to the occupant while harbored within the enclosed area.

15 Claims, 6 Drawing Sheets

SAFE ROOM ASSEMBLY

BACKGROUND

1. Field of the Invention

The present application relates generally to safe rooms, and more specifically, to a safe room configured to protect persons and property against dangerous weather conditions.

2. Description of Related Art

Conventional safe rooms and/or shelters are well known in the art for effectively protecting persons and property from dangerous storm conditions such as hurricanes and tornadoes, which can reach wind speeds over 250 mph and are capable of staying on the ground for over one hour. The dangerous weather conditions can easily cause mass destruction with flying debris, resulting in significant damage to property, and in some cases, physical injury. Thus, homeowners who choose not or cannot evacuate their homes during the extreme weather conditions are forced to take cover in a protected area of the home. It should be understood that the homes provide relatively little protection, which are typically not constructed to withstand tornado or hurricane weather conditions. As such, there is a need for each home to have a safe room that can withstand the extreme weather conditions.

Safe rooms are typically buried underground to further increase safety. These types of shelters have limitations, including the manufacturing cost and risk of being trapped underground with overhead debris blocking access. Further, the underground structures are typically not accessible to the handicapped and elderly. Also, some properties are not well suited for underground construction. As a result, the safe rooms are configured for aboveground placement. However, the underground safe rooms are cost prohibitive to most families, thereby making these types of shelters ineffective.

Although the foregoing developments in shelters represent great strides, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the safe room assembly and method of manufacturing and use is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the safe room assembly are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The safe room assembly of the present application overcomes the above-listed problems commonly associated with conventional safe rooms and/or shelters. Specifically, the safe room assembly is configured for aboveground placement on a platform and secured thereto via a plurality of locking mechanisms. The safe room is manufactured as a single integral structure, preferably via a casting manufacturing process. During the manufacturing process, an electrical system is completely disposed within the walls, thereby providing electrical access to one or more utility systems disposed within the safe room. The simplicity of design allows for reduced costs and allows for easily and rapid installation. These and other unique features of safe room assembly are discussed below and illustrated in the accompanying drawings.

The safe room assembly and method of manufacturing and use will be understood, both as to its structure and operation, from the accompanying drawings, taken in conjunction with the accompanying description. Several embodiments of the safe room are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIGS. 1-5 depict various views of a safe room assembly 101 in accordance with a preferred embodiment of the present application.

Figure 1:
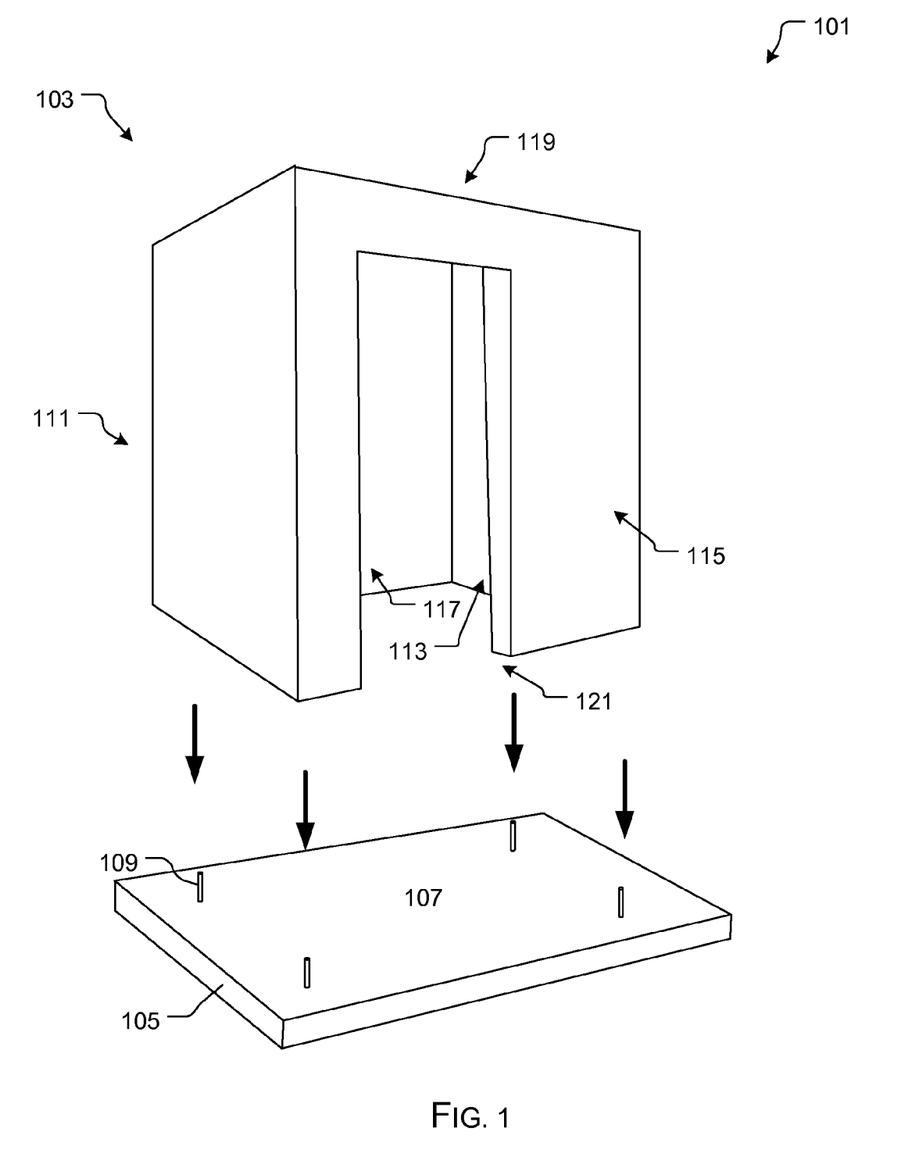
FIG. 1 is an oblique view of a safe room according to a preferred embodiment of the present application.

FIG. 1 shows an oblique view of safe room assembly 101 preferably comprising one or more of a room 103 configured to securely rest on a top surface 107 of a platform 105. In the preferred embodiment, room 103 is preferably positioned aboveground, while platform 105, e.g., a concrete slab, is buried at least partially below ground level. A plurality of anchors 109 (for viewing simplicity, only one fastener is identified; however, all anchors share the same characteristics) are utilized to secure room 103 to platform 105.

One unique feature believed characteristic of assembly 101 is the ease of manufacturing, which preferably includes the process of casting the room with a die (not shown), transporting the casted room to a designated location, and then securing the room to the platform. The relatively simple process of manufacturing and installing assembly 101 provides significant advantages, namely, the costs to own and operate assembly 101 is minimal, thereby allowing the majority of homeowners the option to purchase safe room assembly for their home.

In the contemplated embodiment, room 103 preferably includes an enclosure 104 with one or more of four walls and a roof that form an enclosed area for harboring persons during extreme weather conditions. Specifically, two side walls 111, 113 are integrally joined together by a front wall 115 and a back wall 117. A roof 119 is also integrally joined to the four walls to create a single room with integral walls. It will be appreciated that alternative embodiments could include rooms with different shapes, e.g., cylindrical rooms and additional walls, e.g., five walls in lieu of the preferred embodiment.

Another unique feature believed characteristic of room 103 is having all four side walls and the roof as an integral structure; whereas, conventional rooms are manufactured having two or more members, which are joined together when assembled. These rooms result in a structurally weaker design than the contemplated safe room.

Room 103 is manufactured with sufficiently durable material to retain structural integrity for compensation against extreme weather conditions. In the preferred embodiment, room 103 is manufactured with a high-strength concrete that is preferably reinforced with rebar disposed within one or more of the walls and/or roof. The concrete material and rebar are readily available materials and relatively easy to use during the manufacturing and assembly process. Alternative embodiments could utilize additional materials, e.g., bricks that are also cast with the concrete. It is contemplated forming room 103 through a casting manufacturing process, e.g., pouring the concrete within a die cast and thereafter removing the casted material upon the concrete curing. Alternative embodiments could include differently materials sharing one or more of the same characteristics of concrete and rebar.

Front wall 115 forms an entrance 121 preferably manufactured at a non-central location on wall 115, e.g., near the right or left side of wall 115. Entrance 121 has a sufficient height for ingress and egress. It will be appreciated that alternative embodiments could include one or more entrances or openings in lieu of a single entrance.

During assembly, room 103 is placed on platform 105 and is securely held thereto via the plurality of anchors 109. This assembly process is further discussed below with reference to FIGS. 7A-7C.

Figure 2:
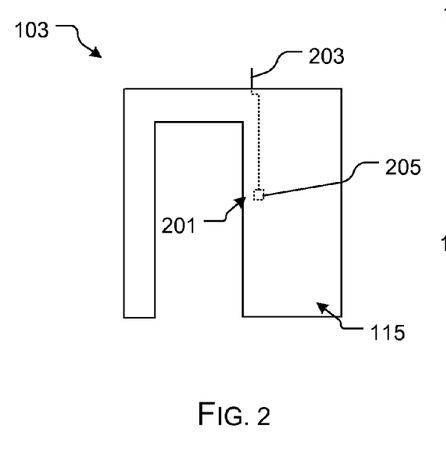
FIG. 2 is a front view of the safe room assembly of FIG. 1.

Referring specifically to FIG. 2, a front view of room 103 is shown. Assembly 101 is further optionally provided with an electrical system 201 (shown with phantom lines) configured to provide electrical energy to one or more devices disposed within room 103. System 201 preferably includes one or more of an electrical conduit 203 operably associated to an electric box 205, which in turn can serve as an outlet box for an electrical device 204. Conduit 203 could be utilized as means for channeling, for example, an electrical wire and is preferably disposed within front wall 115 and is exposed to the outside of room 103 for connection with an electrical power supply (not shown), which could be the utility company and/or a generator. Although shown extending through wall 115, it will be appreciated that conduit 203 can also be disposed within and extend through other walls and/or the roof.

Another unique feature believed characteristic of safe roof assembly 101 is the manufacturing process that includes the additional step of disposing electrical system 201 within the walls during the casting process. In particular, system 201 is placed within the die cast and the concrete is poured therearound. Thus, system 201 becomes integral with the solid walls, completely disposed therein. This feature provides significant advantages, namely, having one or more conductors within the walls reduces the possibility of electrical shock, fires, and damage—all likely results in extreme weather conditions. As such, the walls serve as a protective barrier to the conductors.

It will also be appreciated that alternative embodiments could utilizes the features of system 201, specifically, having one or more components disposed within the wall during the casting process. For example, a water system could include a fluid conduit disposed within the wall for passage of water from an outside source to the enclosed area of room 103.

Figure 3:
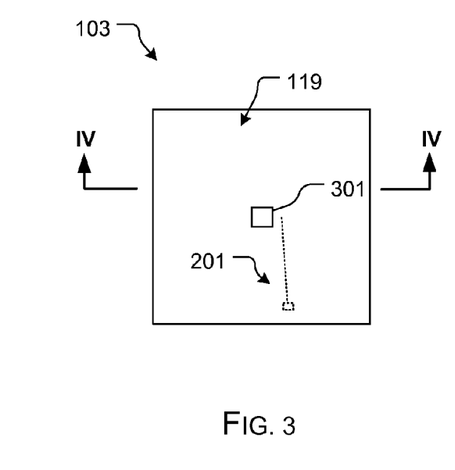
FIG. 3 is a top view of the safe room assembly of FIG. 1.
Figure 4:
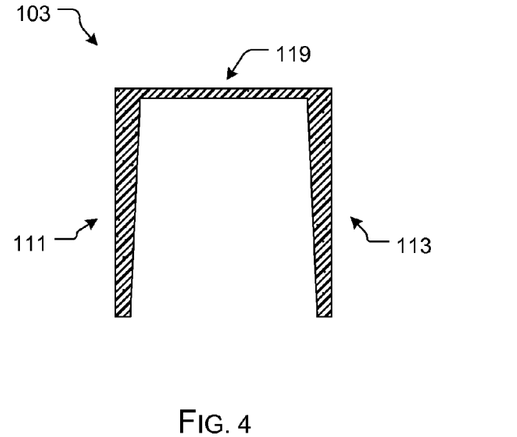
FIG. 4 is a cross-sectional view of the safe room assembly taken at IV-IV of FIG. 3.
Figure 5:
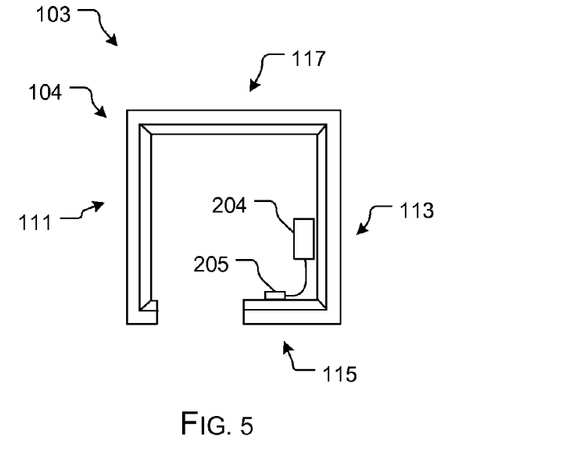
FIG. 5 is bottom view of the safe room assembly of FIG. 1.

Referring specifically to FIG. 3, a top view of room 103 is shown. Room 103 is further optionally provided with an opening 301 extending through the thickness of roof 119. In the contemplated embodiment, opening 301 serves as an air vent, a lighting fixture, a possible escape area, and/or viewing means.

Although not shown, it will be appreciated that opening 301 and entrance 121 could include doors and/or other structures that open and close access to room 103.

Figure 6:
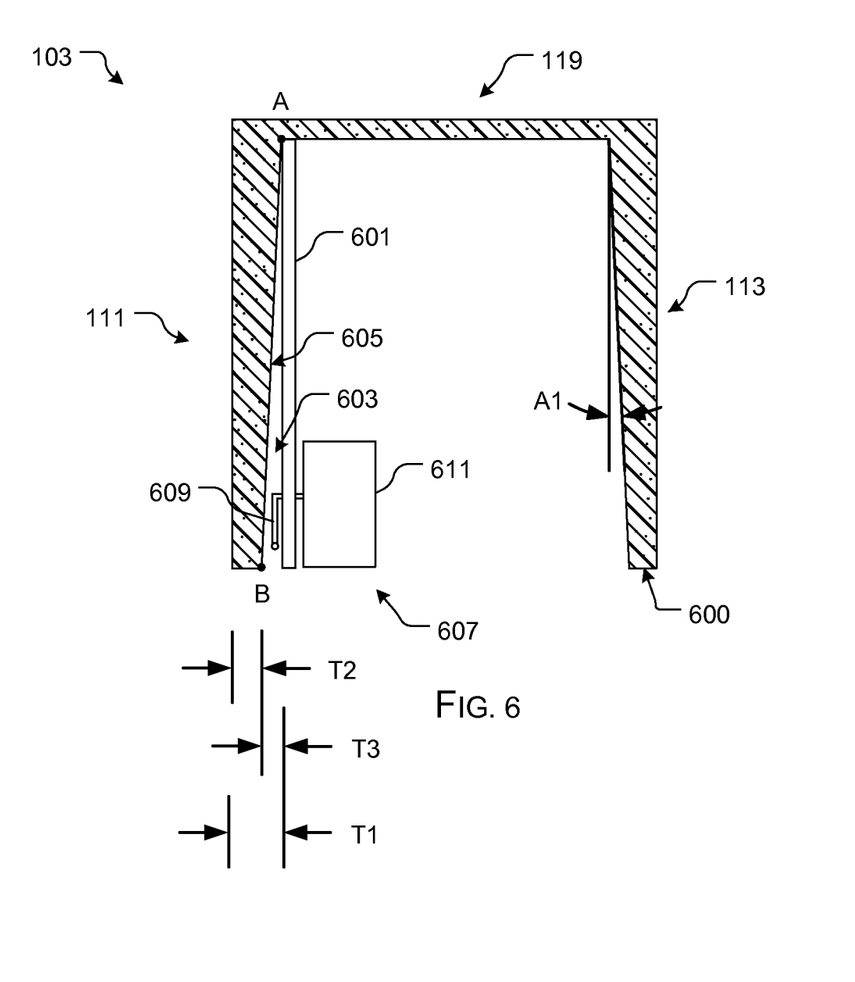
FIG. 6 is FIG. 4 with room accessories.

In FIG. 6, a cross-sectional view is shown with optional room accessories. In the contemplated embodiment, assembly 101 is further provided with a wall structure 601 that attaches to the side walls of room 103. For example, the exemplary embodiment utilizes a plurality of sheets of drywall rigidly attached to wood studs, which in turn are secured to the inner walls. It will be appreciated that the accessories provide both aesthetic and utility means for persons required to spend long durations within room 103.

Another unique feature believed characteristic of assembly 101 is tapering the walls from a greater thickness near the roof, as indicated by point "A", to a lesser thickness near a bottom surface 600 that rests on platform 105, as indicated by point "B". As depicted, wall 113 has a greater thickness "T1" at point "A", than thickness "T2" at point "B." Although shown as a linear tapering, it is also contemplated having the wall gradually taper in non-linear fashion. It has been found that a minimal tapering angle "A1" of approximately 2.5 degrees is optimal for effectively removing room 103 from the die cast while also retaining sufficient structural integrity against severe weather conditions. The tapering of the walls allows the room to easily slide out of the casting dies during the manufacturing process, and also, the tapering forms a gap 603, indicated by thickness "T3", which is commonly referred to as a mechanical chase, between structure 601 and the inner surface 605 of wall 111.

Assembly 101 is further optionally provided with one or more of a utility system 607 disposed within room 103. As shown, gap 603 provides passage for a conduit 609 or conductor, e.g., electrical wire operably associated with an electrical device 611. In one exemplary embodiment, room 103 could house a utility system such as a toilet in fluid communication with a conduit passing through gap 603.

Other utility systems are also contemplated such as a stove in gaseous communication with a gas conduit passing through gap 603. Thus, an alternative embodiment could utilize a flexible conduit at least partially disposed within the wall for use with gas, electricity, water, internet cables, phone lines, and the like.

Referring now to FIGS. 7A-7D in the drawings, front partial cross-sectional views of assembly 101 are shown. In the contemplated embodiment, room 103 is configured to be securely attached to platform 105 via a plurality of anchors 109 embedded within platform 105 and configured to extend partially outside surface 107. In the contemplated embodiment, anchor 109 is a metal rod, e.g., rebar that engages with a locking mechanism 701 disposed within the walls of the room. Locking mechanism 701 includes a housing 703 in communication with two passages: passage 705 and 707. A optional rod 709 disposed within the wall is configured to attach to housing 703 and is configured to retain housing 703 in a fixed position, while also adding additional support and rigidity to the walls of room 103.

Figures 7A, 7B:
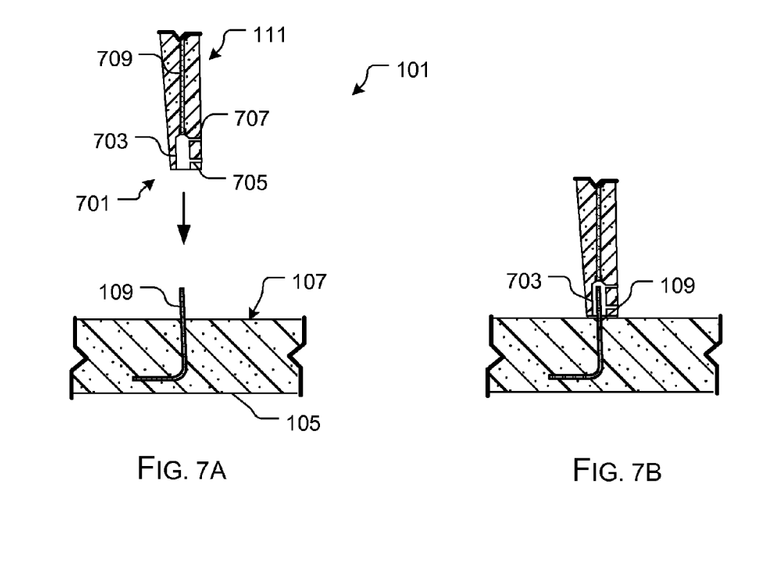
FIGS. 7A-D are cross-sectional views of the anchoring devices associated with a locking mechanism of the safe room assembly of FIG. 1.
Figure 7C:
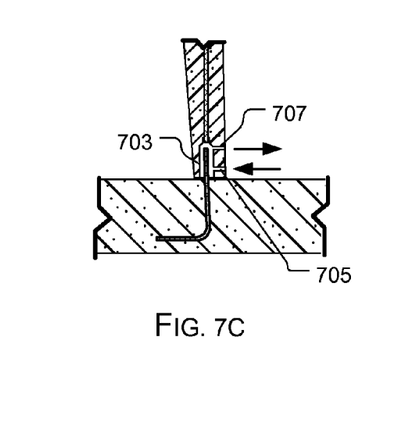
Figure 7D:
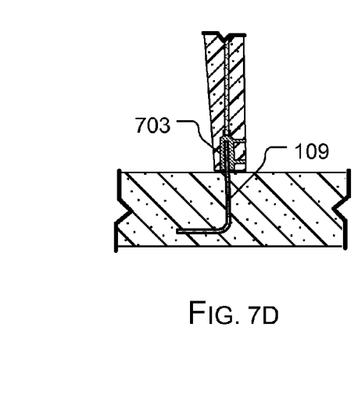
Figure 8:
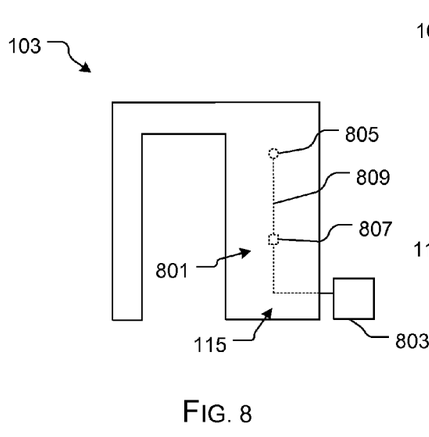
FIG. 8 is a front view of an alternative embodiment of the safe room assembly of FIG. 1.
Figure 9:
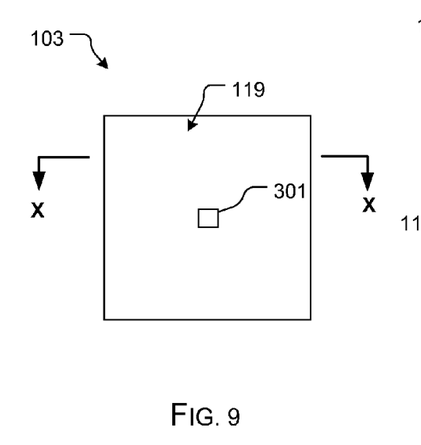
FIG. 9 is a top view of an alternative embodiment of the safe room assembly of FIG. 1.
Figure 10:
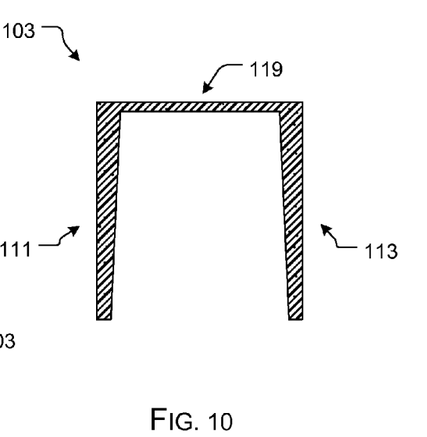
FIG. 10 is a cross-sectional view of an alternative embodiment of the safe room assembly taken at X-X of FIG. 9.
Figure 11:
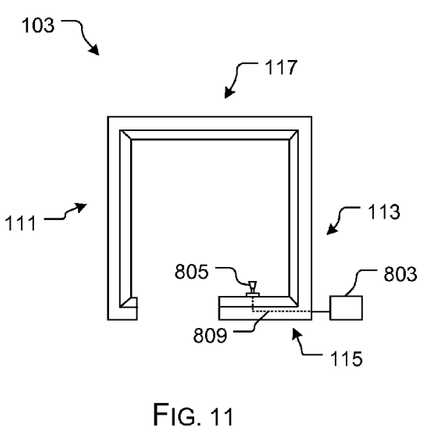
FIG. 11 is bottom view of the safe room assembly of FIG. 1.

In FIG. 7B, the side wall is positioned on surface 107 and anchor 109 slides within housing 703. Thereafter, a sealing material such as grout or concrete enters into housing 703 via passage 705 and the excessive sealing material exits through passage 707. This feature ensures that housing 703 is completely filled with the sealing material. The sealing material is configured to thereafter retain anchor 109 within the inner cavity of housing 703.

Referring now to FIGS. 8-12, various views of an alternative embodiment of assembly 101 are illustrated. It will be appreciated that exemplary embodiment includes one or more of the features discussed above with respect to the preferred embodiment, and is further provided with a utility system 801, for example, a water system operably associated with one or more utility devices, e.g., a facet, disposed within the enclosed area.

In the preferred embodiment, utility system 801 is a water system that includes one or more of a fluid reservoir 803 in fluid communication with a facet 805 and a valve 807 via fluid conduits 809 at least partially disposed within at least one wall of the enclosure. During use, fluid travels from reservoir 803 to facet 805 via conduit 809. The valve 807 is utilized to restrict the fluid passage within conduit 809.

Figure 12:
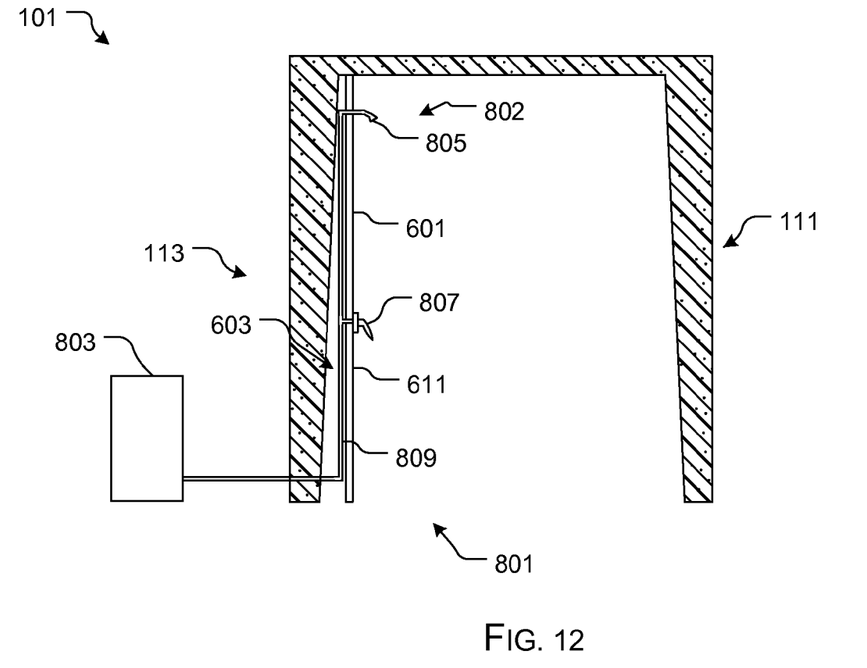
FIG. 12 is FIG. 10 with room accessories.

In the exemplary embodiment, conduit 809 is configured to pass through wall 115 and run alongside wall 115 within the gap 603, e.g., the mechanical chase (see, e.g., FIG. 12). It will be appreciated that conduit 809 can be formed with a plurality of different components, which assists in the manufacturing process. For example, conduit 809 could include a first component disposed solely within the wall and releasably attached to one or more components; the three components being utilize to increase the overall length of conduit 809.

The preferred manufacturing method includes the process of positioning conduit 809 within the die casting members prior to pouring a wall material, e.g., concrete, then the process continues by allowing the material to cure and thereafter removing the cured material from the die cast members. One of the unique features believed characteristic of the present application is having a conduit disposed within the wall during the manufacturing process. This feature provides significant advantages, namely, there is no need for additional post manufacturing procedures for installing the conduit, for example, drilling through the thickness of the wall to position the conduit therein, which could potentially compromise the structural integrity of the wall.

Utility system 801 provides effective means for channeling fluid from an external source to one or more devices positioned within room 103. Persons within room 103 thus have access to a water source while staying inside room 103 during extreme weather conditions.

It will be appreciated that reservoir 803 can be an external water tank and/or connection to a water supply, for example, a municipal water supply. Although shown positioned outside the room, it will be appreciated that alternative embodiments could include a reservoir positioned within the enclosure.

In the exemplary embodiment, conduit 809 is shown passing through wall 113; however, it will be appreciated that conduit 809 could pass through one or more different walls of room 103, including the ceiling and floor.

Figure 13:
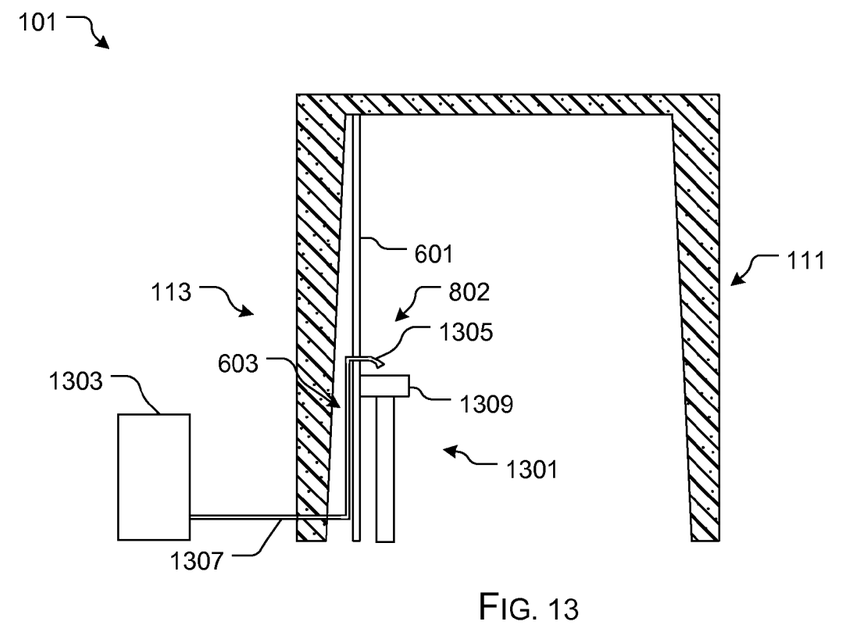
FIG. 13 is an alternative embodiment of the safe room assembly of FIG. 12.

Although utility system 801 is illustrated as a shower in the exemplary embodiment, it will be appreciated that system 801 is easily adapted to be incorporated with sinks and/or other fluid devices requiring an external water source. For example, FIG. 13 illustrates another alternative embodiment of a utility system 1301 that includes a water reservoir 1303 in fluid communication with a facet 1305 via a conduit 1307. Utility system 1301 shares one or more of the features of system 801; however, system 1301 is utilized with a sink 1309.

Thus, in both systems 801 and 1301, an external water source is in fluid communication with one or more water devices 802, which in the contemplated embodiments are, for example, shower facets and/or sink facets. Alternative water devices are also contemplated in different embodiments of the present application.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A combination of a safe room assembly and a utility system, comprising:
   the safe room assembly, having:
      an enclosure forming an enclosed area, the enclosure having a first generally vertical sidewall;
      a wall structure disposed within the enclosed area and removably attached to the first sidewall;
      wherein the wall structure is concrete and tapers from a top edge to a bottom edge;
      a gap formed between the wall structure and the first sidewall; and
      a conduit casted within the enclosure, the conduit being configured to extend through the first wall, extend within the gap, and pass through the wall structure; and
   the utility system being in communication with the conduit;
   wherein the enclosed area is configured to provide safe harbor for an occupant during weather conditions; and
   wherein the utility system is configured to provide utilities to the occupant while harbored within the enclosed area.

2. The combination of claim 1, the enclosure having:
   a first sidewall and a second opposing sidewall; and
   a front wall and an opposing back wall;

wherein the first sidewall, the second sidewall, the front wall, and the back wall are integral with each other to form the enclosed area.

3. The combination of claim 2, the safe room assembly, further comprising:
   a locking mechanism completely disposed within the first sidewall; and
   an entrance providing access to the enclosed area.

4. The combination of claim 3, the safe room assembly, further comprising:
   a platform, having:
      a top surface; and
      an anchor partially disposed within a thickness of the platform and extending through the top surface;
   wherein the locking mechanism is configured to engage and secure to the anchor.

5. The combination of claim 2, wherein the utility system is an electrical system configured to provide electricity from a power source positioned outside the enclosure to an electrical device positioned within the enclosed area.

6. The combination of claim 5, the electrical system, having:
   an electrical outlet box attached to an inner surface of the front wall; and
   an electrical conductor configured to pass through the conduit.

7. The combination of claim 2, wherein the utility system is a water system configured to provide water from a reservoir positioned outside the enclosure to a water device positioned within the enclosed area.

8. The combination of claim 7, the water system, further comprising:
   a shower facet;
   wherein water from the reservoir passes through the conduit to the shower facet.

9. The combination of claim 8, the water system, further comprising:
   a sink; and
   a sink facet;
   wherein water from the reservoir passes through the conduit to the sink via the sink facet.

10. The combination of claim 2, wherein the utility system is a gas system configured to provide gas from a reservoir positioned outside the enclosure to a gas device positioned within the enclosed area.

11. A safe room assembly, comprising:
    a solid concrete wall forming an enclosed area;
    wherein the concrete wall tapers from a top edge to a bottom edge;
    a generally vertical wall structure disposed within the enclosed area and removably attached to the concrete wall;
    a gap formed between the wall structure and the concrete wall;
    a conduit disposed within the concrete wall and extending from one end that is exposed at an outside surface of the concrete wall to an inside surface of the concrete wall, the conduit being configured to extend within the gap and to pass through the wall structure; and
    a utility system in communication with the conduit;
    wherein the enclosed area is configured to provide safe harbor for an occupant during weather conditions; and
    wherein the utility system is configured to provide utilities to the occupant while harbored within the enclosed area.

12. The safe room assembly of claim 11, wherein the utility system is an electrical system configured to provide electricity from a power source positioned outside the enclosure to an electrical device positioned within the enclosed area.

13. The safe room assembly of claim 11, wherein the utility system is a water system configured to provide water from a reservoir positioned outside the enclosure to a water device positioned within the enclosed area.

14. The safe room assembly of claim 13, the water system, further comprising:
    a shower facet;
    wherein water from the reservoir passes through the conduit to the shower facet.

15. The safe room assembly of claim 11, wherein the utility system is a gas system configured to provide gas from a reservoir positioned outside the enclosure to a gas device positioned within the enclosed area.

* * * * *